United States Patent
Landau

Patent Number: 5,862,830
Date of Patent: *Jan. 26, 1999

[54] WATER REPLENISHING PLUG FOR A BATTERY CONTAINING A LIQUID ELECTROLYTE

[75] Inventor: Reinhard Landau, Viersen, Germany

[73] Assignee: Landau Systemtechnik GmbH, Viersen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 682,346

[22] Filed: Jul. 17, 1996

Related U.S. Application Data

[63] Continuation of Ser. No. 682,346, Jul. 17, 1996.

[30] Foreign Application Priority Data

Jul. 25, 1995 [DE] Germany ................ 295 11 994.2

[51] Int. Cl.$^6$ ................................ H01M 002/36
[52] U.S. Cl. ................... 137/260; 137/429; 429/64; 429/76
[58] Field of Search ................. 429/64, 72, 73, 429/74, 76, 71; 137/260, 386, 429, 434, 430; 141/198, 204, 212, 216, 301, 303

[56] References Cited

U.S. PATENT DOCUMENTS

| | | | |
|---|---|---|---|
| 1,618,894 | 2/1927 | Smock | 429/64 |
| 3,625,245 | 12/1971 | Biermann | 137/434 |
| 3,911,972 | 10/1975 | Hubers et al. | 429/74 X |
| 4,386,141 | 5/1983 | Weidner et al. | 429/64 |
| 4,512,378 | 4/1985 | Oschmann . | |
| 4,696,874 | 9/1987 | Tadiello | 429/64 |
| 4,749,633 | 6/1988 | Elias | 429/64 |
| 4,751,156 | 6/1988 | Olimpio . | |
| 5,309,937 | 5/1994 | Rover | 429/64 X |
| 5,453,334 | 9/1995 | Melichar | 429/64 |

FOREIGN PATENT DOCUMENTS

| | | |
|---|---|---|
| 2 311 412 | 10/1976 | France . |
| WO 91/17577 | 11/1991 | WIPO . |

*Primary Examiner*—Anthony Skapars
*Attorney, Agent, or Firm*—Townsend and Townsend and Crew LLP

[57] ABSTRACT

A water replenishment plug for batteries containing a liquid electrolyte has a push-in plug housing (11) which is made complementary at the outside to an upper battery housing opening. Furthermore, a water chamber (13) is provided at the push-in plug housing (11) at the top and has a water supply opening (15) closeable by the valve (14) and at least one flow connection to the region of the push-in plug housing (11) which, after the insertion into a battery housing opening, communicates with the interior of the battery. Furthermore, at least one tube stub (16) is provided onto which a water supply hose can be placed and which stands in flow connection (17) with the valve inlet (18). A float (19) which projects out of the push-in plug housing (11) at the bottom is connected via a float rod (20) and a cross-piece (21) provided at its upper end region to the valve body (22) which has a valve stem (27) and cooperates with a valve seat (15) at the valve housing (24). In accordance with the invention the valve stem (27) is connected to the cross-piece (21), in a form-fitted and play-free manner, at least in the vertical direction.

6 Claims, 3 Drawing Sheets

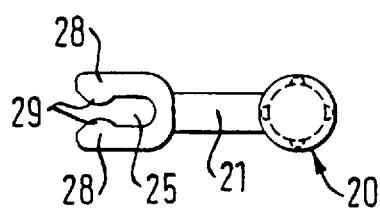
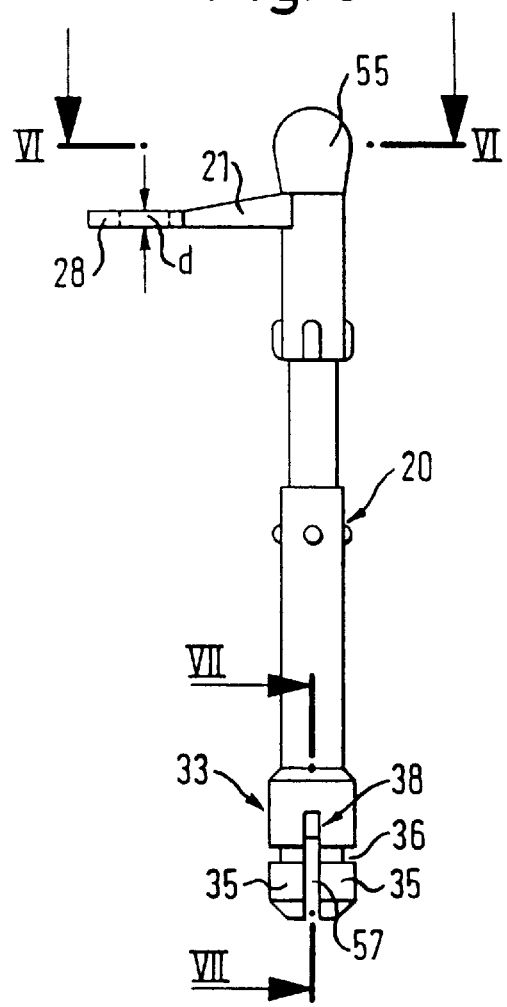
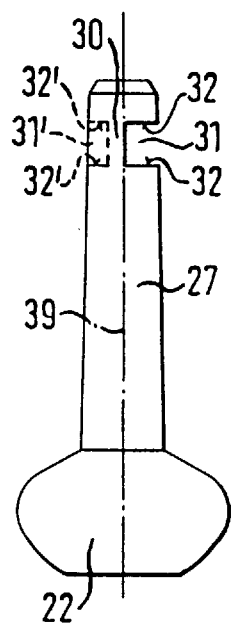
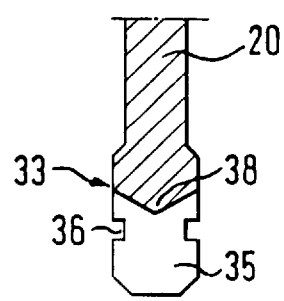

ness of the invention is further improved by a design in which the push-in plug housing is formed at the bottom as a push-in plug. This design is primarily used for traction batteries. This water replenishment plug can in practice be used for any conceivable type of battery through the provision of diverse adapters.

WATER REPLENISHING PLUG FOR A BATTERY CONTAINING A LIQUID ELECTROLYTE

This application is a continuation of and claims the benefit of U.S. patent application Ser. No. 08/682,346, filed Jul. 17, 1996, the disclosure of which is incorporated by reference.

FIELD OF THE INVENTION

The present invention relates to a water topping or replenishment plug for batteries containing a liquid electrolyte and comprising:

a push-in plug housing which is either made complementary at the outside of its lower region to an upper battery housing opening or to an adapter which is, in turn, complementary to an upper battery housing opening, an outwardly closed, preferably cylindrical water chamber or or a water chamber having a cover at the top, arranged at the top of the push-in plug housing, with the water chamber having a water supply opening which can be closed by a valve and at least one flow connection to that region of the push-in plug housing which, after insertion into a battery housing opening, communicates with the inner space of the battery, at least one pipe stub onto which a water supply hose can be placed and which is in flow connection with the valve inlet, and a float which projects out of the push-in plug housing at the bottom and which is connected via a float rod and a cross-piece provided at its upper end region to the valve body and which is arranged in a valve housing, the valve housing having, on the one hand, the valve inlet and, on the other hand, the water supply opening.

DESCRIPTION OF PRIOR ART

A water replenishment plug of this kind is already known from the international patent application with the publication number WO-91/17577. It serves to automate and make more reliable the topping-up of water in batteries, in that on attaining a predetermined liquid electrolyte level, a valve is automatically closed and thus prevents further water running into the interior of the battery.

The known water replenishment plug has the disadvantage that the valve stem or thruster is moveably arranged over a certain region relative to the cross-piece of the float rod which, in the known arrangement, is considered necessary for the purpose of reliable closure of the valve. However, the moveable arrangement of the valve stem at the cross-piece requires an increased level of manufacturing complexity and leads to an unreliable mechanical connection of the float and valve body. In addition, it involves the danger that the mobility reduces with time, for example due to contamination, whereby the float rod and the valve stem can ultimately adopt less favorable positions relative to one another.

OBJECT OF THE INVENTION

It is an object of the present invention is to substantially simplify the installation of the water replenishment plug and, at the same time, to ensure that a precise spatial position is fixed between the float and the valve body.

In order to satisfy this object the present invention provides that the valve stem is connected to the cross-piece in a form-fitted manner and free of play, at least in the vertical direction.

In this manner the float, the float rod, the cross-piece, the valve stem and the valve body practically form a rigid constructional unit, which not only has the required strength for rough operation, but rather also ensures that an unambiguous relative position of the valve body and the float is ensured throughout the entire working life.

In one advantageous embodiment of the invention the valve stem is clipped to the cross-piece.

The end of the cross-piece facing the valve stem is preferably of resilient fork-like design and the upper end of the valve stem is made complementary thereto in such a way that the upper end of the valve stem can be laterally introduced into the fork opening and is held there free of play in the lateral and vertical directions.

This may be achieved if the fork prongs have lateral projections facing one another, which—after insertion of the upper end of the valve stem—engage behind the peripheral surface of the upper end of the valve stem, and in this manner hold the valve stem laterally.

The valve stem can have a lateral groove with horizontal side flanks at the top, into which one of the fork prongs of the fork fittingly engages and holds the valve stem free of play at least vertically.

The above-described embodiments are particularly advantageous with respect to easy installation and simultaneously ensure that the desired precise structural relationship between the valve body with the valve stem on the one hand and the float with the float rod and the cross-piece on the other hand remain guaranteed. The universal applicability of the water replenishment plug of the invention is further improved by a design in which the push-in plug housing is formed at the bottom as a push-in plug. This design is primarily used for traction batteries. This water replenishment plug can in practice be used for any conceivable type of battery through the provision of diverse adapters.

In a particularly preferred design the water replenishment plug is characterized in that the push-in plug housing is formed at the bottom for the placement of various adapters.

BRIEF LISTING OF THE FIGURES

FIG. 1 is a schematic side-view of a first embodiment of a water replenishment plug made in accordance with the invention for batteries containing a liquid electrolyte, FIG. 2 is a rear view of the subject matter of FIG. 1 with the float removed, FIG. 3 is a plan-view of the subject matter of FIG. 2, FIGS. 4a to 4e are views similar to FIG. 1 and showing with floats of different depths, FIG. 5 is an enlarged side-view of the float rod of the invention with a cross-piece.

FIG. 6 is a partly sectioned view taken along line VI—VI of FIG. 5,

FIG. 7 is a sectional view taken along line VII—VII of FIG. 5,

Figure 1:
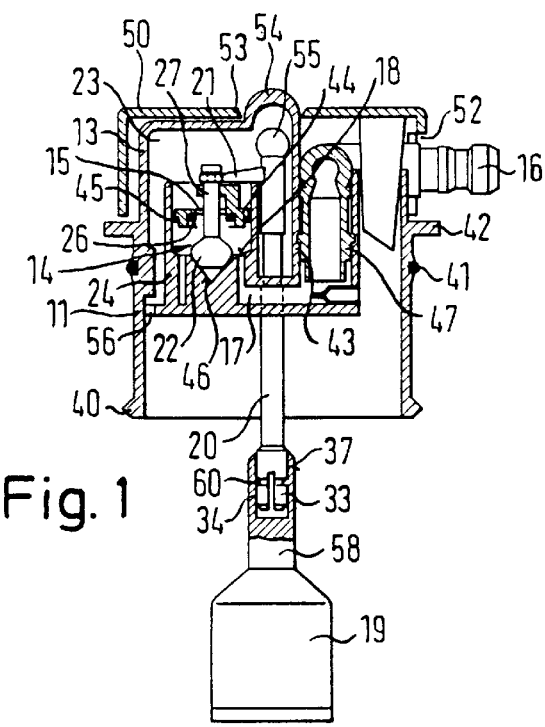
Figure 9:
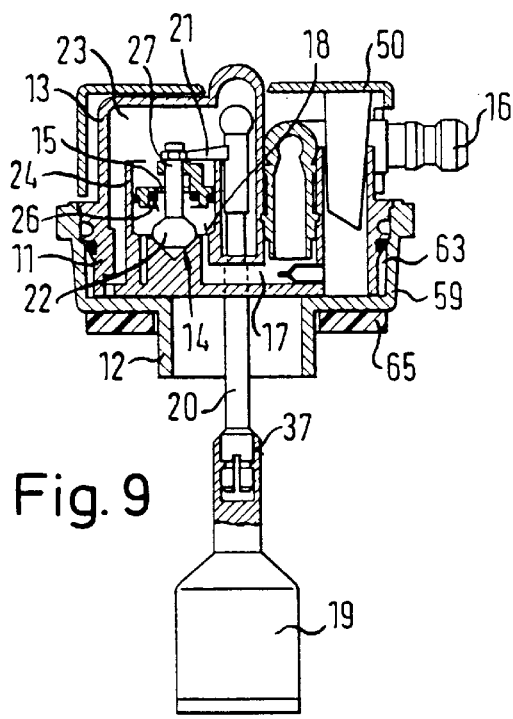
Figure 10:
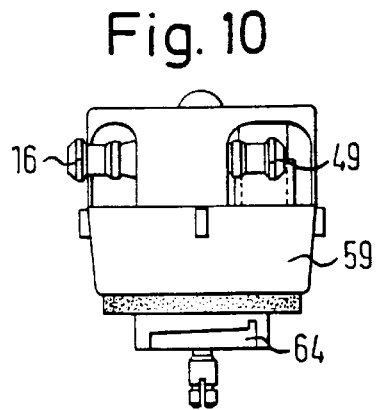
Figure 11:
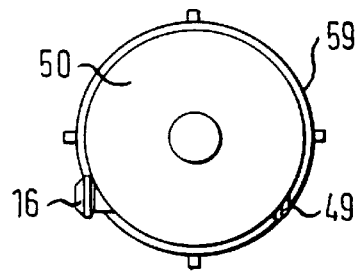
Figure 12A:
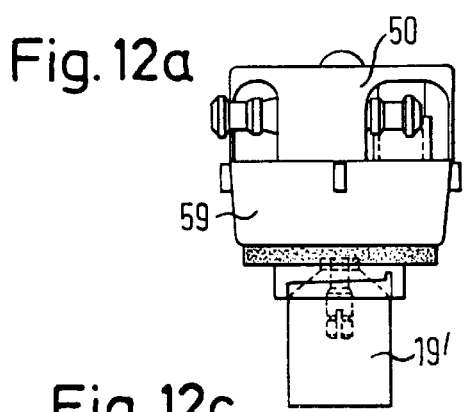
Figure 12B:
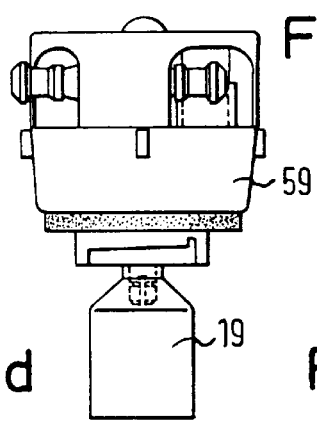
Figure 12C:
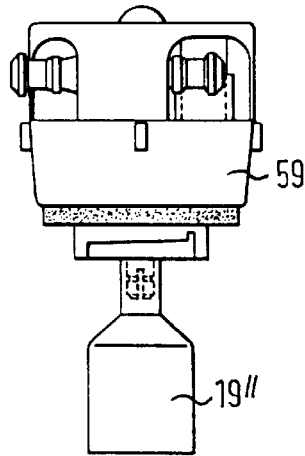
Figure 12D:
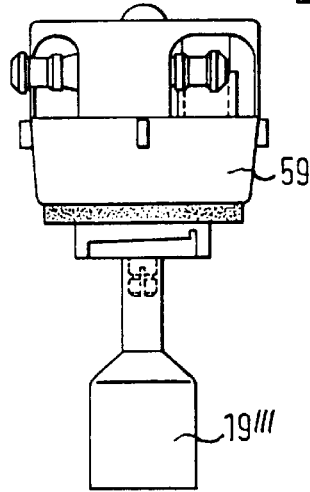
Figure 12E:
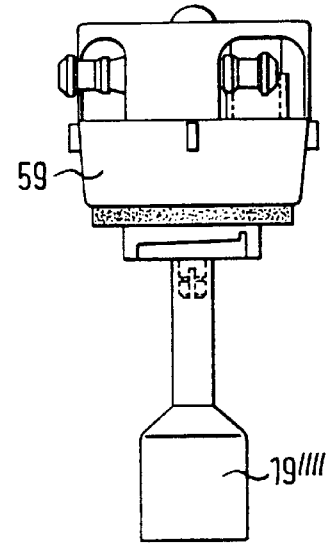

FIG. 8 is a side-view of the valve body of the invention with the valve stem arranged thereon at the top and with two different embodiments being indicated to the left and right of a central axis 39 of the valve stem, FIG. 9 is a sectional view similar to FIG. 1 of a further embodiment of the invention, FIG. 10 is a rear-view of the subject matter of FIG. 9 with the float removed, FIG. 11 is a plan-view of the subject matter of FIG. 10, and FIGS. 12a to 12e are views similar to FIG. 10 with floats of different depths being arranged on the float rod.

DESCRIPTION OF PREFERRED EMBODIMENTS

Figure 2:
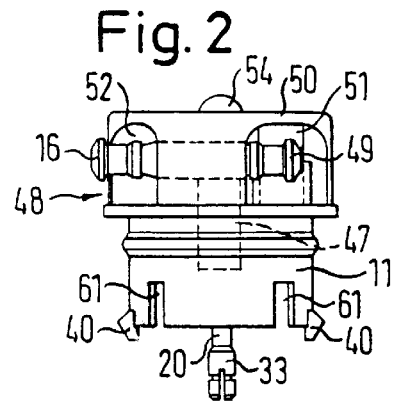
Figure 3:
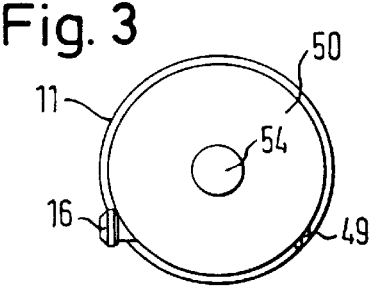

Referring to FIGS. 1–3, a push-in plug housing 11 which is open downwardly and essentially closed at the top has a holding lip 40 at the bottom and above this a sealing ring 41 by means of which the push-in plug housing 11, which has been inserted into a non-illustrated battery housing opening, can be sealingly and vertically firmly arranged in this opening. A ring flange 42 ensures that the push-in plug housing 11 can only be pushed in until the ring flange abuts a counter-surface of the battery housing. As a result of downwardly open axial slots 61 the lower edge region of the push-in plug housing 11 can deflect resiliently radially inwardly on insertion into a battery opening, whereby the holding lip 40 can snap into a complementary peripheral groove provided at the battery housing to reliably hold the water replenishment plug on the battery housing.

On the push-in plug housing 11 which is essentially closed at the top there is located a valve housing 24 at a clear vertical spacing from the lower sealing lip 40. The valve housing 24 contains a valve body 22 with a valve stem 27 arranged thereon at the top, with the valve stem extending with clearance through an upper water supply opening 15 into the inner space 23 of a water chamber 13 located above it. The water chamber 13 is eccentrically inserted into a cover plate of the housing 11, which is flush with the ring flange 42, and is of substantially circular cylindrical shape with a clearly smaller diameter than the housing. The upper end of the valve stem 27 is secured to a cross-piece 21 in a form-fitted manner and free of play, at least in the vertical direction, with the other end of the cross-piece being firmly connected to a vertically extending float rod 20. The float rod 20 extends from the top into a vertical tube 43 which is open at the top and is molded onto the water chamber 13 at the side. The tube 43 is open at the bottom and extends up to the level of the base of the chamber 13 so that the float rod 20 passes with clearance through this tube 43 in order to end at a small distance below the sealing lip 40 in a coupling piece 33.

A circular ring-like valve seat 26 is provided around the water supply opening 15 at the lower side of the cover of the valve housing 24 and cooperates with the upper part spherical surface of the valve body 22 in such a way that on contact of the valve body 22 against the valve seat 26 the water through-flow opening 15 is closed.

The cover 44 of the valve housing 24 is sealed and preferably also vertically held by a ring seal 45 relative to the periphery of the valve housing 24.

In this manner a valve 14 is formed which is shown in FIG. 1 in the open position, in which the valve body 22 rests in a funnel-like opening 46 at the base of the valve housing 24 and a float 19 is located in its lowermost position, the float 19 being secured at the bottom to the float rod 20 at the coupling piece 33 by means of a coupling counter-piece 34.

Whereas the water supply opening 15 forms the outlet of the valve 14, a valve inlet 18 is provided directly adjacent the conical downwardly tapering opening 46 and is connected via a flow connection 17 which initially extends vertically downwardly and then horizontally, with the interior of the stem tube 47 of a T-shaped distributor 48 which has two tube stubs 16, 49 extending perpendicular to the stem tube 47 and which are located at the top side of the push-in plug housing 11 and onto which water supply and discharge hoses can be connected. A cover 50 is clipped onto the overall arrangement and has lateral through-flow openings 52 and 51, respectively, through which the tube stubs 16, 49 are accessible.

The upper side of the water chamber 13 is formed as a cover 53 with an indicator dome 54 which is located above the upper spherical end 55 of the float rod 20, whereby the vertical position of the float rod 20 and thus of the float 19 can be viewed.

The water replenishment plug of the invention shown in FIGS. 1 to 3 is assembled as follows;

It is first assumed that the push-in plug housing 11 is inserted in accordance with FIGS. 1 to 3 into an upper opening of a non-illustrated battery housing up to the ring flange 42, and that the liquid level in the interior of the battery is so low that the float 19 is either located above the liquid level or is only dipped into the electrolyte to such a small degree that it has not yet reached a floating state. In this case the valve body 22 lies in the conical opening 46, as a result of the weight of the float 19 of the float rod 20, the cross-piece 21, valve stem 27, and valve body 22.

If now water is formed from tube stub 16 into the stem tube 47 with the tube stub 49 closed, it flows through the flow connection 17 and the valve inlet 18 into the interior of the valve 14 and from there through the water supply opening 15 into the water chamber 23. From there the water can then flow partly through tube 43 past float rod 20 or through openings otherwise provided in the red region of the water chamber 23, for example an outlet opening 56, into the interior of the battery housing, whereby the liquid electrolyte level rises there. In this way the float 19 dips ever deeper into the liquid electrolyte until it finally floats and is lifted upwardly by the liquid level. The valve 22 is thereby also moved upwardly via the float rod 20, the cross-piece 21 and the valve stem 27 until it finally seats against valve seat 26 from below and thereby closes valve 14. The liquid flow from the tube stub 16 into the interior space 23 of the water chamber 13 is now interrupted and the electrolyte level in the battery housing cannot rise further.

The second tube stub 49 at the T-shaped distributor serves for the attachment of a further hose, which then leads to a further water replenishment plug in accordance with the invention. In this manner numerous water replenishment plugs can be connected in series and can be fed with distilled water from a single source. At the last water replenishment plug in the row the tube stub 49 must be closed in order to prevent water running out there.

In accordance with the invention the float rod 20 only extends a short distance beneath the push-in plug housing 11 and there has a coupling piece 33 which, in accordance with FIGS. 5 and 7, is formed as a fork 38 having two resilient prongs 35 which are separated from one another by an elongate slot 57 and which include a peripheral groove 36.

As is shown in FIG. 1 the upper end of a bar-like part 58 of the float 19 is formed as a blind hole. The blind hole 37 has a complementary shape to the coupling piece 33 and in particular has radially inwardly oriented projections 60 which can also be formed as a ring bead. In this manner the coupling counter-piece 34 can be fittingly pushed onto the coupling piece 33. By resilient pressing together of prongs 35 (FIGS. 5, 7,) the projections 60 at the inner wall of the blind hole 59 can snap into the ring groove 36, whereby the float 19 forms a fixed component with the float rod 20.

Figure 4A:
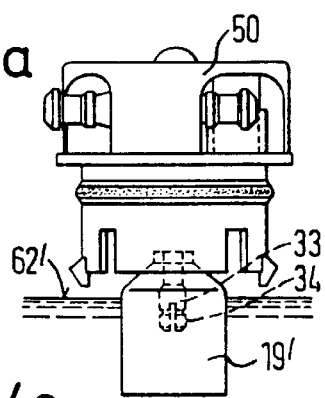
Figure 4B:
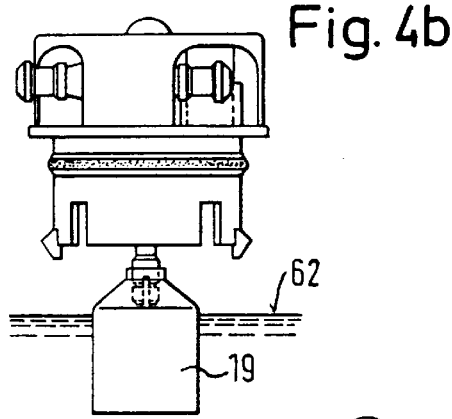

FIG. 4b shows a float 19 which is formed in accordance with FIG. 1 and can, for example, be intended for an accumulator or a battery in which, after the mounting of the water replenishment plug, a liquid level 62 is to be present. In the position shown in FIG. 4b the float 19 is located in the raised position and the valve 14 (FIG. 1) is closed.

A float 19', which has a central bore open towards the top, can also be arranged on one and the same coupling piece 33 in accordance with FIG. 4a, with the coupling piece 33 to the float rod 20 penetrating through the bore substantially deeper into the float 19' up to the coupling counter-piece 34 located there, where again the above-described connection between the float 19' and the float rod 20 is produced by a clipping action. The float 19' which does not dip so deeply into the battery housing is, for example, to be used when the electrolyte level 62' is to have the desired height 62', for example, within the battery closed by the plug.

Figure 4C:
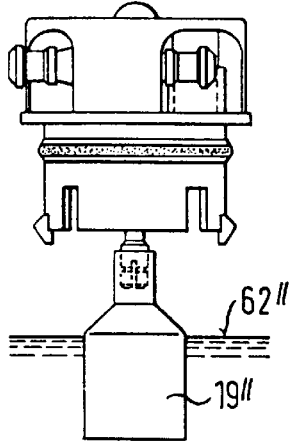
Figure 4D:
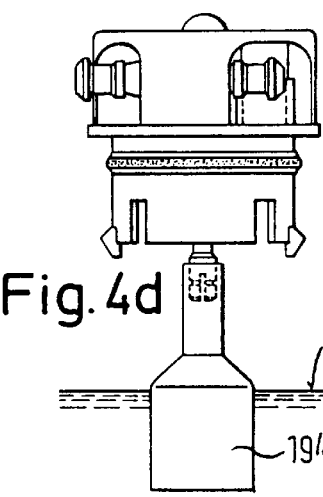
Figure 4E:
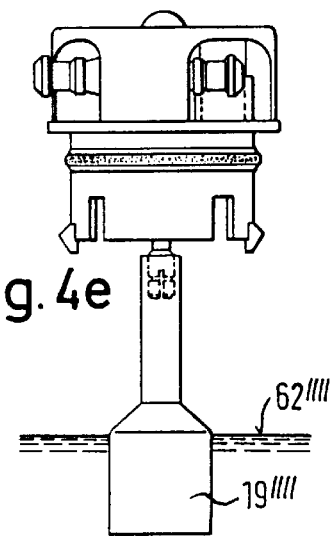

FIGS. 4c, 4d and 4e show floats 19", 19'" and 19"" which are respectively suited to deeper desired liquid levels 62", 62'" and 62"".

A particulary advantageous design of the cross-piece 21 at the upper end of the float rod 20 is shown in FIGS. 5 and 6. In accordance with this embodiment one end of the cross-piece 21 is fixedly and non-releasably secured, for example by adhesive bonding, welding or common molding, to the float rod 20.

The oppositely disposed free end forms a fork, having prongs 28 which can be resiliently forced apart, and which define between them a slot 25. At the end of slot 25 remote from the float rod 20 prongs 28 have lateral projections 29 which extend inwardly.

In accordance with FIG. 8 the upper end of the valve stem 27 is provided with a groove 31 which extends up to the central axis 39 with the base of the groove extending parallel to the central axis 39 and with its side flanks 32 having a planar and horizontal extent.

Alternatively, two corresponding grooves 31' which are, however, not so deep could be provided at diametrically opposite sides of the valve stem 27 as is indicated in broken lines in FIG. 8 on the left-hand side of the central axis 39.

The height of the grooves 31 or 31' is to be selected in accordance with the thickness d of the cross-piece 21 in the region of the fork prongs 28 (FIG. 5).

Furthermore, it is important that entry ramps are provided at the lateral projections 29 and indeed at the open side of the fork slot 25.

In this manner the groove 31 or the grooves 31' of the valve stem 27 can be pushed from the side with perpendicular alignment to the cross-piece 21 onto the fork prongs 28 while pressing the latter apart. As soon as the web at the end of the base of the groove 31 or of the groove 31' is located in the broadened part of the fork slot 25 the fork prongs snap together again, with the lateral projections 29 contacting the periphery 30 (FIG. 8) of the valve stem 27 in such a way that the valve stem 27 is secured against being pulled off from the cross-piece 21.

The circumferential part of the valve stem 27 which stands diametrically opposite to that peripheral part which stands in engagement with the lateral projections 29 lies at the end of the fork slot 25 which faces the float rod 20.

In FIGS. 9 to 12 the same reference numerals designate components which correspond to those described previously.

In distinction to FIG. 1 the embodiment of FIGS. 9 to 11 has a downwardly shortened push-in plug housing 11. A ring adapter 59 is mounted on the latter from the bottom over a receiving opening 63 complementary to the outer circumference of the push-in plug housing 11 and is sealingly connected to the push-in plug housing 11.

At its lower side the adapter 59 has a circularly cylindrical closure projection which has a bayonet closure device 64 (FIG. 10) at its outer periphery which cooperates with a complementary counter-piece in the battery housing. Moreover, a disc seal 65 is provided around the closure projection 12.

In place of the adapter 59 shown in FIGS. 9 and 10 with a bayonet closure projection 12, adapters can also be provided whose receiving opening 63 is identically formed to that of FIGS. 9, 10 but which, however, has a closure projection 12 which is equipped with a thread, for example a thread M27 or a thread M30.

In this manner the water replenishment plug of the invention can also be used with battery housings which have a bayonet closure device or a metric thread M27 or M30 in their water topping opening.

FIGS. 12a to 12e correspond to FIGS. 4a to 4e and make it clear that the base body of the water replenishment plug of the invention, which results from FIGS. 9 and 10, can be equipped both with different adapters 59 and also with different floats 19, 19', 19", 19'", 19"" so that with a single type of base body of this kind a universal adaptation can take place to different types of battery housing openings and to different desired electrolyte levels in the batteries.

What is claimed is:

1. A water replenishment plug for batteries containing a liquid electrolyte comprising:

a push-in plug housing for placement into an opening in an upper part of a battery housing and communicating with an inner space of the battery, the housing including a region which, following placement of the housing in the opening, communicates with the inner space;

an outwardly closed water chamber arranged at a top of the push-in plug housing;

a valve including a valve housing defining a water supply opening for the water chamber and a valve body for closing the supply opening, the water supply opening being provided at an upper side of the valve housing;

at least one flow connection from the water chamber to the region of the push-in plug housing;

at least one pipe stub for connection to a water supply and in flow communication with an inlet for the valve;

a float operatively coupled with the push-in plug housing and arranged in the valve housing so that the float extends past an end of the housing facing the inner battery space when the housing is placed in the housing;

a float rod;

a cross-piece at an upper end region to the valve body, the cross-piece including a resilient, fork-shaped end defining a pair of spaced-apart prongs having lateral projections facing one another and being arranged in the same horizontal plane, the float rod and the cross-piece connecting the float and the valve body;

a valve seat oriented to face the valve body and located about the water supply opening; and a valve stem extending from the valve body through the water supply opening and clipped to the cross-piece, the valve stem having an upper end with a peripheral surface and a lateral groove with horizontal, vertically spaced-apart side flanks, the lateral projections of the fork-shaped end of the cross-piece engaging behind the peripheral surface of the upper end of the valve stem to laterally hold the valve stem with at least one of the prongs fittingly engaging and holding the valve stem free of play at least in a vertical direction.

2. A water replenishment plug in accordance with claim 1, wherein the valve stem has a pair of lateral grooves with horizontal, vertically spaced-apart side flanks.

3. A water replenishment plug in accordance with claim 1, wherein both prongs fittingly engage and hold the valve stem free of play at least in the vertical direction.

4. A water replenishment plug in accordance with claim 1, wherein the push-in plug housing has a bottom formed as a push-in plug.

5. A water replenishment plug in accordance with claim 1, wherein the push-in plug housing has a bottom shaped for connection to an adapter.

6. A water replenishment plug in accordance with claim 1, wherein at least one of the prongs fittingly engages and holds the valve stem free of play in the vertical direction and a lateral direction.

* * * * *